United States Patent
Ikeda et al.

(10) Patent No.: US 7,099,738 B2
(45) Date of Patent: Aug. 29, 2006

(54) CAM SYSTEM AND PROGRAM, AND METHOD FOR CONTROLLING CAM SYSTEM

(75) Inventors: Mitsuru Ikeda, Atsugi (JP); Masato Honda, Atsugi (JP); Fusao Shibata, Fujieda (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/706,270

(22) Filed: Nov. 13, 2003

(65) Prior Publication Data
US 2004/0128019 A1 Jul. 1, 2004

(30) Foreign Application Priority Data
Nov. 13, 2002 (JP) .............................. 2002-329962

(51) Int. Cl.
*G06F 19/00* (2006.01)
(52) U.S. Cl. ....................... 700/182; 706/919; 715/964
(58) Field of Classification Search ................ 700/175, 700/182, 188, 195; 706/919; 715/964
See application file for complete search history.

(56) References Cited

U.S. PATENT DOCUMENTS

| | | | | |
|---|---|---|---|---|
| 4,833,617 A * | 5/1989 | Wang | .......................... | 700/173 |
| 5,317,518 A * | 5/1994 | Fujita et al. | ................. | 700/184 |
| 5,796,618 A * | 8/1998 | Maeda et al. | ............... | 700/182 |
| 6,597,968 B1 * | 7/2003 | Matsumoto et al. | ........ | 700/188 |
| 6,671,571 B1 * | 12/2003 | Matsumiya et al. | ........ | 700/172 |
| 6,738,507 B1 * | 5/2004 | Liasi et al. | .................. | 382/152 |
| 6,804,568 B1 * | 10/2004 | Miyazaki et al. | ............. | 700/98 |
| 6,826,516 B1 * | 11/2004 | Ito | ................................. | 703/1 |
| 6,862,560 B1 * | 3/2005 | Edwards et al. | ............... | 703/7 |
| 2003/0033041 A1 * | 2/2003 | Richey | ........................ | 700/98 |

FOREIGN PATENT DOCUMENTS

JP 8-257874 10/1996

OTHER PUBLICATIONS

Hengzheng Lu et al., Automatic Measurement of 3-D Object Shapes Based on Computer-generated Reference Surfaces, Dec. 1987, pp. 251-257.

* cited by examiner

*Primary Examiner*—Jayprakash N. Gandhi
(74) *Attorney, Agent, or Firm*—Staas & Halsey LLP

(57) ABSTRACT

A Computer Aided Manufacturing (CAM) system enables high efficiency and high quality. The CAM system of this invention includes a unit that uses a computer aided design (CAD) model that is solid model data of a metal mold to be made and a measured work geometric model that is geometric model data of a work, which is obtained by measuring a work to be machined, to generate a cutting margin model that is difference between the measured work geometric model and the CAD model, and unit that generates numerical control (NC) data based on the generated cutting margin model. According to this invention, one of ordinary skill in the art can easily machine an actual article in conformity with the actual shop floor in the actual factory to make a metal mold.

15 Claims, 4 Drawing Sheets

CAM SYSTEM AND PROGRAM, AND METHOD FOR CONTROLLING CAM SYSTEM

This invention relates to a Computer Aided Manufacturing (CAM) technology, and more particularly to technology to control a Numerical Control (NC) machine.

BACKGROUND OF THE INVENTION

At one time, artisans specializing in manufacture of metal molds were well aware of the know-how of metal mold machining from the beginning to the end thereof, and contrived a means in conformity with components to be machined, to make inexpensive and high-quality metal molds.

However, by introduction of the NC machine and CAM technology, the work process was divided into NC data generation, NC machining, and finishing. The current CAM program assumes a uniform working method, and aims to enable anyone to machine the metal molds with simple operations by standardization of the working condition, datalization of the working pattern, and usage of the high-speed machine.

Therefore, it is assumed that a work to be machined has a specific shape and tools are new.

In such an environment, information communication between an NC data generation department and a machining department is carried out by using communication document forms, such as instruction sheets and/or working drawings, feedback document forms used when a machining failure occurred and the like. Incidentally, these document forms are paper sheets or electrical data.

As a result of unnoticed progress of the division of work and the partial optimization, a communication gap between persons in charge of the NC data generation and machining operators existed, and a wall against the improvement of technology and skill was formed.

JP-A-08-257874 discloses a technique in which outside dimension of a work piece is measured by a distance measuring device, and in a case where the outside dimension is smaller than machining dimension described in a NC machining program mentioned above, a machining start position is corrected so as to be adjacent to a side of the work piece in accordance with the dimensional difference.

SUMMARY OF THE INVENTION

Therefore, an object of this invention is to provide a new CAM system enabling high efficiency and high quality and also enabling an artisan to machine an actual article in conformity with the actual situation in the actual shop floor to make a metal mold.

Another object of this invention is to provide the CAM system of new metal mold machining methodology enabling the spiral-up of the machining technology and skill.

To achieve aforementioned objects, a CAM system of this invention includes means for using a computer aided design (CAD) model that is solid model data of a metal mold to be made and a measured work geometric model that is geometric model data of a work, which is obtained by measuring a work to be machined, to generate a cutting margin (also called cutting allowance) model that is a difference between the measured work geometric model and the CAD model, and means for generating numerical control (NC) data based on the generated cutting margin model.

Moreover, a method for controlling a CAM system, comprises: obtaining a CAD model that is solid model data of a metal mold to be made and a measured work geometric model that is geometric model data of the work, which is obtained by measuring the work to be machined; generating a cutting margin model that is a difference between the measured work geometric model and the CAD model; and generating NC data based on the generated cutting margin model.

Incidentally, it is also possible to create a program for causing a computer to function as the aforementioned CAM system of this invention or a program for causing a computer to execute the aforementioned method, and the program is stored in a storage medium or a storage device, for example, a flexible disk, a CD-ROM, a magneto-optical disk, a semiconductor memory, or a hard disk. Besides, there is also a case where the program is distributed as digital signals through a network. Incidentally, data under processing are temporarily stored in a memory of the computer.

DETAILED DESCRIPTION OF THE PREFERRED EMBODIMENTS

Figure 1:
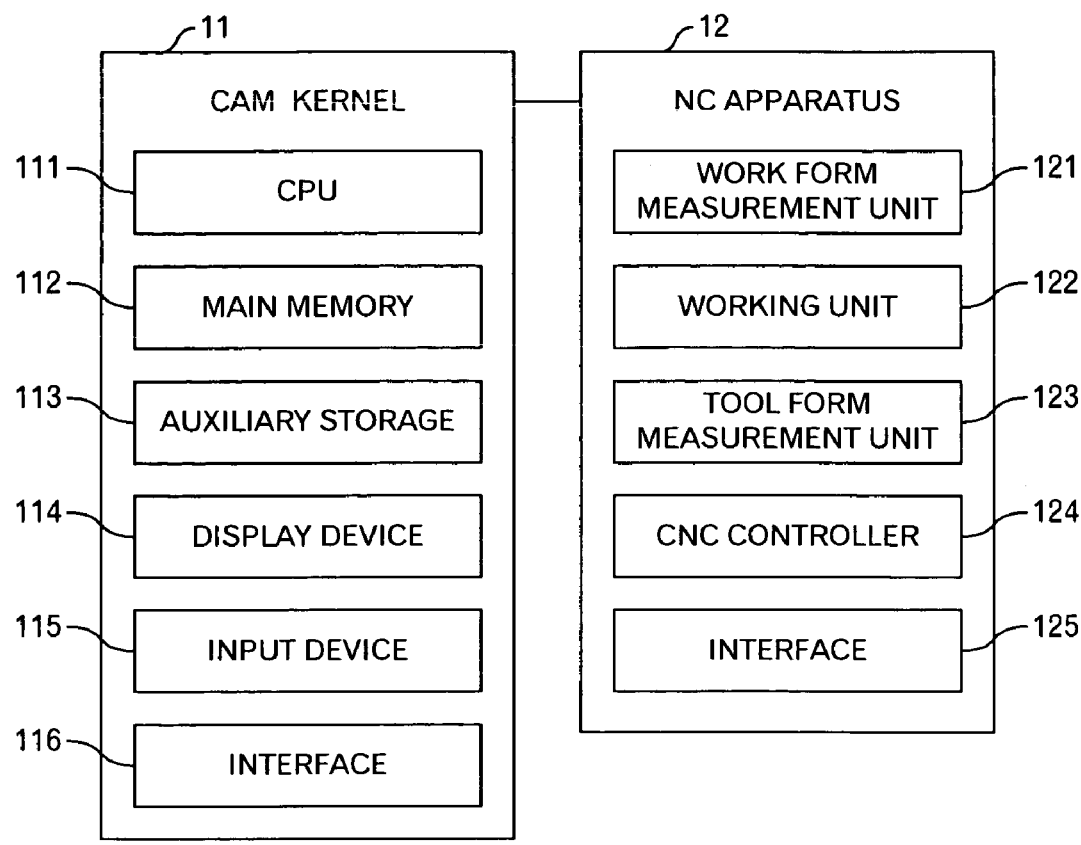
FIG. 1 is a diagram showing a system configuration in an embodiment of this invention.

FIG. 1 shows an example of a CAM system configuration according to an embodiment of this invention.

The CAM system of this embodiment comprises a CAM kernel 11 and an NC apparatus 12.

The CAM kernel 11 controls operations of the NC apparatus 12 by transmitting control data to the NC apparatus 12, and carries out various kinds of processings based on information received from the NC apparatus 12. Similar to a normal personal computer, it is composed of a general-purpose computer including a central processing unit (CPU) 111, main memory 112, auxiliary storage 113, display device 114, input device 115, various kinds of interfaces 116 and the like, and programs executed on the computer. The functions of programs operating on the CAM kernel 11 are explained in detail later.

The NC apparatus 12 has a work form measurement unit 121, which measures a form of a work to be machined, working unit 122 having an AC servo for machining the work, to which a rotational tool such an end mill is installed, tool form measurement unit 123 that measures a form of a tool in a state in which the tool is attached to the AC servo, Computer Numerical Control (CNC) unit 124 for controlling the work form measurement unit 121, working unit 122, and tool form measurement unit 123 in accordance with control data from the CAM kernel 11, and for informing information concerning the AC servo to the CAM kernel 11, and interface 125 for managing the communication with the CAM kernel 11.

In this embodiment, the work form measurement unit 121 is composed of a Charge-Coupled Device (CCD) camera and a sinusoidal grating projector that projects a striped pattern to the work from an angle, which is different from the photographing direction of the CCD camera by a predetermined angle. As for the detail, see H. Lu et al., "Automatic Measurement of 3-D Object Shapes Based on Computer-generated Reference Surface", Bull. Japan Soc. of Prec. Eng. Vol. 21, No.4, p251 (1987).

The working unit 122 and CNC unit 124 are ordinary ones. The tool form measurement unit 123 measures a contour form of a tool such as an end mill installed to the AC servo in the rotational state.

Moreover, the NC apparatus 12 transmits the CAM kernel 11 following information during the NC machining in real time:

position deviation (difference between an instructed value and an actual value)
servo current
servo electric power (load)
cutting power
temperature
vibration
others Next, functions of the CAM kernel 11 and data used in the CAM kernel 11 are explained.

First, the CAM kernel 11 has following functions:
CAD data reading function 201
work form measurement function 202
cutting margin (also called cutting allowance) model generation function 203
cutting margin model coloring display function 204
tool form measurement function 205
NC data generation function 206
tool path display function 207
real time monitoring function 208
monitoring data storage function 209
cutting load graph generation function 210

In a storage device (the main memory and auxiliary storage) of the CAM kernel 11, following data is stored:
CAD model 211
measured work model 212
cutting margin model 213
tool model 214
monitoring data 215

Figure 2:
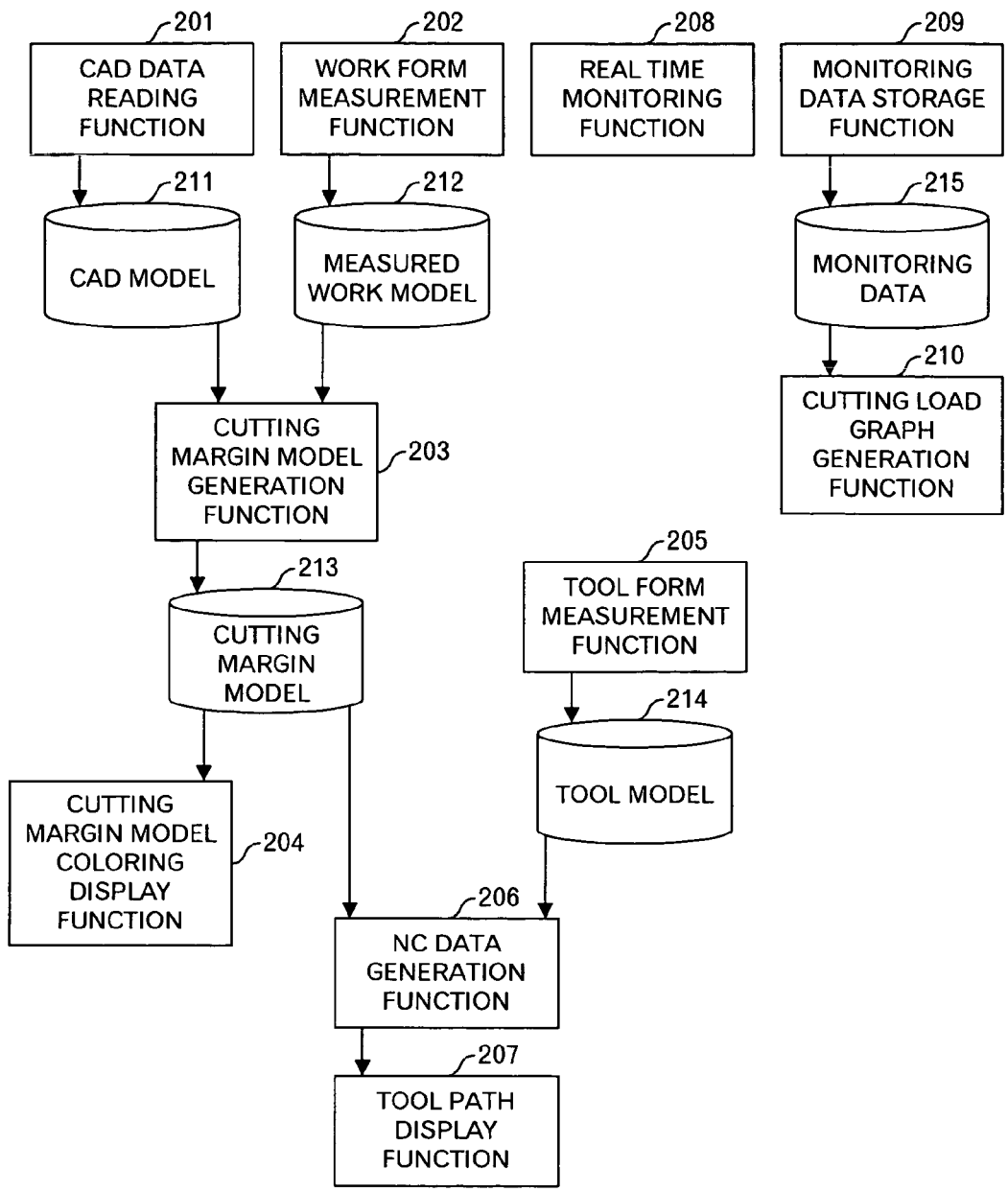
FIG. 2 is a diagram showing a relationship between functions achieved by a CAM kernel program and various kinds of data, and a processing flow of the CAM kernel.

FIG. 2 shows relationships between the aforementioned functions and data, and a processing flow of the CAM kernel 11. Referring to FIG. 2, each function and the relationship with the data are explained.

(a) CAD Data Reading Function 201

The CAD data reading function 201 communicates with other CAD system via a communication interface, and reads CAD data of the solid model of a metal mold to be machined into a storage device as the CAD model data 211.

(b) Work Form Measurement Function 202

The work form measurement function 202 computes the form of the work based on image data received from the work form measurement unit 121 in the NC apparatus 12, which responds to a measurement instruction of the form, generates the measured work model 212, and stores it into the storage device.

(c) Cutting Margin Model Generation Function 203

The cutting margin model generation function 203 computes a difference between the CAD model 211 and measured work model 212 that are stored in the storage device, generates the cutting margin model 213 representing how thick the cutting should be carried out as to each portion of the work, and stores it into the storage device. The difference, which is computed in this function, represents the thickness to be cut at each portion of the work.

(d) Cutting Margin Model Coloring Display Function 204

The cutting margin model coloring display function 204 displays the surface of the measured work model 212 based on the cutting margin model 213 with different colors according to the thickness of the cutting margin. When the colors are determined, a coloring table, which correspondingly manages the thickness of the cutting margin and color information, may be referenced to determine the displayed colors. The machining operator refers to the model displayed by the cutting model coloring display function 204 to determine a cutting method, tool to be used, cutting condition, and the like.

(e) Tool Measurement Function 205

Even if they are the same kind of tools, their forms are not necessarily the same. Because the tool is worn down by its use, the form is changed.

In an example of a ball end mill, the contour form of the new ball end mill has a hemisphere shape in the rotational state. However, when it is worn down, its form may be changed to a cone shape.

Conventionally, because only the model data of the brand-new tool was held and the tool path was computed using it, it was necessary to use the brand-new tool for the highly accurate working. Thereby, the cost increase of the working was caused.

The tool measurement function 205 resolves such a problem. It instructs the tool form measurement unit 123 of the NC apparatus 12 to measure the contour form of the tool in the rotational state of the tool, models tool contour form data based on data transmitted from the tool form measurement unit 123 of the NC apparatus in response to the instruction, and stores it as the tool model 214 into the storage device.

(f) NC Data Generation Function 206

The NC data generation function 206 generates tool path data to cause the tool to move in a state, in which a predetermined cutting volume (or width) is kept, so as to peel off the material from the surface of the work, based on the cutting margin model 213. Incidentally, as for a portion in which there is no cutting margin, the tool is caused to move at high speed, if any load is not put onto the tool. In this processing, the tool model 214 obtained by the tool measurement function 205 is used. The cutting is repeated for a portion in which the cutting margin is large.

Figure 3:
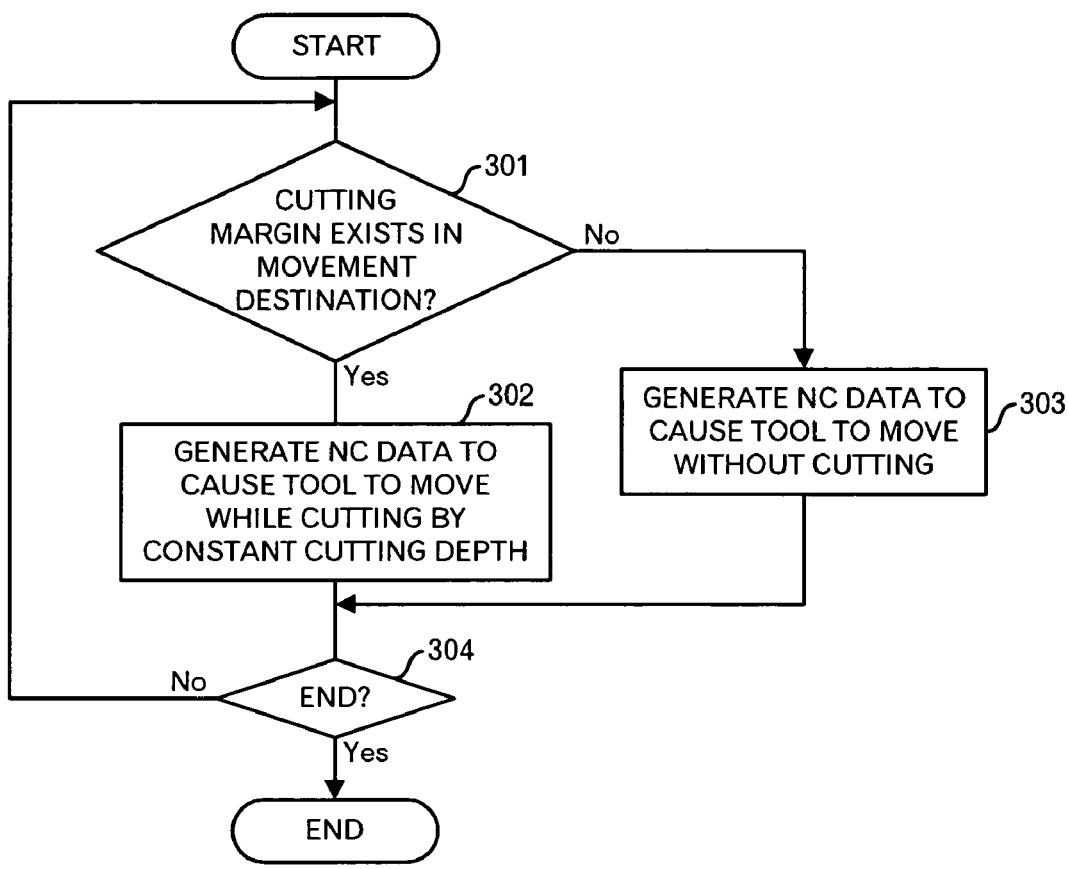
FIG. 3 is a diagram showing a processing flow of an NC data generation function.

FIG. 3 shows a processing flow of the NC data generation function 206.

At step 301, it is judged whether or not there is a cutting margin in the movement destination of the tool. If there is a cutting margin in the movement destination of the tool, the processing shifts to step 302, and if there is no cutting margin, the processing shifts to step 303.

If there is a cutting margin in the movement destination, at step 302, NC data to cause the tool to move while cutting by a constant cutting depth is generated.

If there is no cutting margin in the movement destination, at step 303, NC data to cause the tool to move without cutting is generated. In this case, because the load is hardly put onto the tool, as compared with moving together with the cutting, it is possible to move at high speed.

After the NC data is generated in the step 302 or 303, it is judged at step 304 whether or not there is a further movement destination of the tool. If there is no further movement destination, the processing is terminated. If there is a further movement destination, the processing repeats the step 301 and subsequent steps.

In the aforementioned processing, only NC data to cut by a predetermined cutting depth is generated. In a case where there is a cutting margin more than a predetermined volume, the processing shown in FIG. 3 is repeated until the cutting margin is lost.

The NC apparatus 12 is caused to carry out the automatic machining by using the NC data generated as shown above.

(g) Tool Path Display Function 207

The tool path display function 207 displays the path of the tool by using the NC data generated by the NC data generation function 206. Thus, it becomes possible to confirm how the tool moves without carrying out actual machining.

The tool path display function 207 can also display the paths of a plurality of tool models in different colors, simultaneously. Thus, it is possible for an operator to easily grasp how the difference of the tool form, which is caused by the abrasion or the like, influences to the working.

(h) Real Time Monitoring Function The real time monitoring function 208 monitors the machining, which is carried by the NC apparatus 12 based on the NC data generated by the NC data generation function 206, in real time, and when a high load state is detected, it outputs an interrupt command to the NC apparatus 12 so as to decrease the load.

Figure 4:
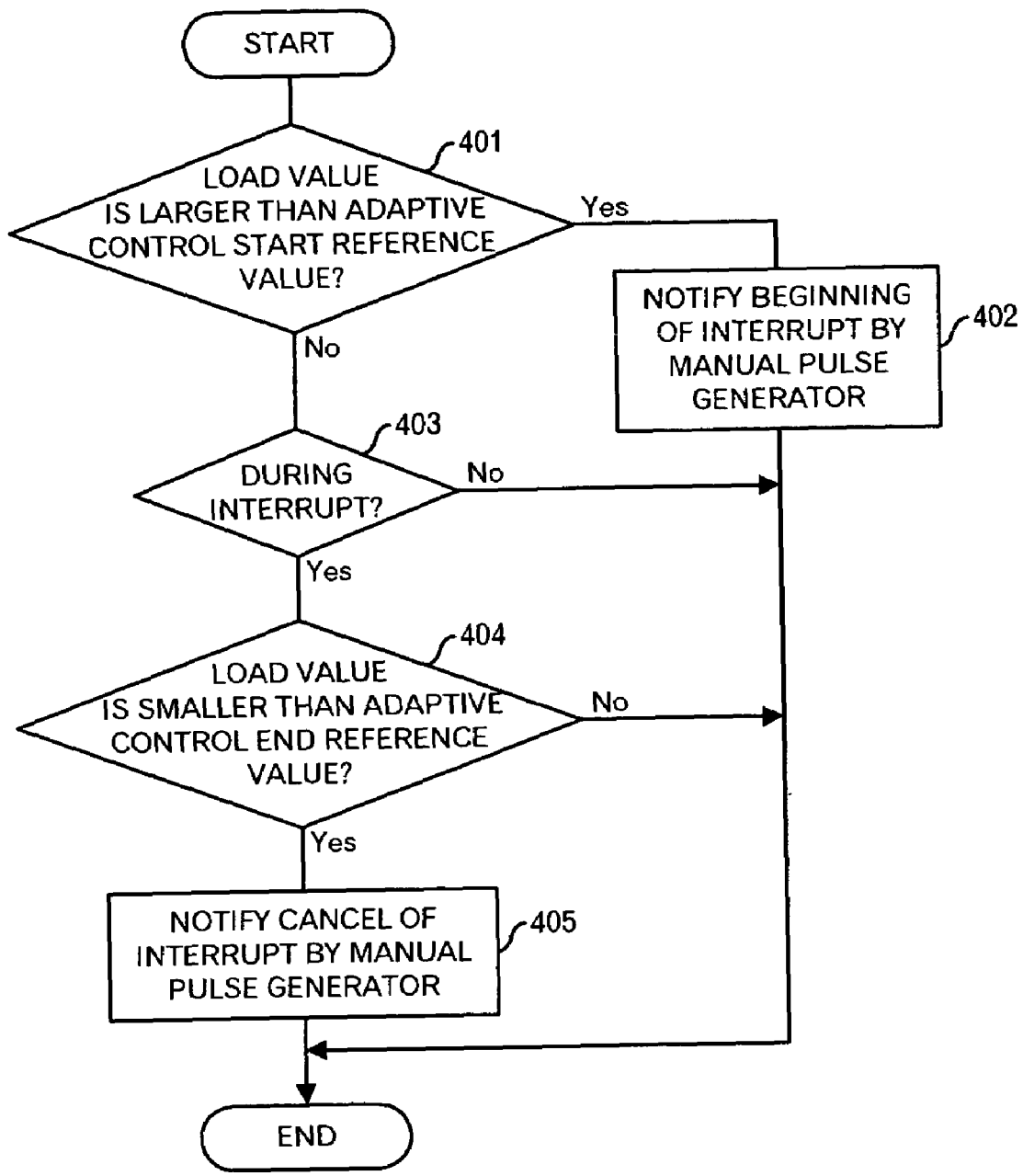
FIG. 4 is a diagram showing a processing flow of a real time monitoring function.

FIG. 4 shows a processing flow of the real time monitoring function 208. In this embodiment, the servo electric power is used as load information. However, any information may be used.

The real time monitoring function 208 carries out the processing flow shown in FIG. 4 each time the servo electric power is informed from the NC apparatus 12.

At step 401, it is judged whether or not a value of the load is larger than an adaptive control start reference value set in advance.

If the value of the load is larger than the adaptive control start reference value set in advance, the processing shifts to step 402. Then, the beginning of an interrupt by a manual pulse generator, which interrupts to a control axis signal, such as X, Y, or Z, is notified to the NC apparatus 12 by using the interrupt command from the manual pulse generator.

The notified information includes a command to change the feed speed of the tool and a command to move the tool in a tool axis direction or a Z-axis direction. The command to move the tool in the tool axis direction or the Z-axis direction includes information concerning a movement amount. The movement amount is a value determined before the beginning of the NC machining, and may be a value input by an operator, or a value calculated by the CAM kernel 11 according to the tool form.

If the value of the load is not larger than the adaptive control start reference value set in advance, the processing shifts to step 403. Then, it is judged whether or not it is during the interrupt by the manual pulse generator.

If it is not during the interrupt by the manual pulse generator, the processing is terminated without any processing. If it is during the interrupt by the manual pulse generator, the processing shifts to step 404.

At step 404, it is judged whether or not the value of the load is smaller than an adaptive control end reference value set in advance. If it is not smaller than the reference value, the processing is terminated without any processing. On the other hand, if it is smaller than the reference value, the processing shifts to step 405.

At step 405, the cancel of the interrupt by the manual pulse generator is notified to the NC apparatus 12.

(i) Monitoring Data Storage Function 209

The monitoring data storage function 209 manages and stores various kinds of information transmitted from the NC apparatus 12 during the NC machining in real time as the monitoring data 215 into the storage device with the CAD data, cutting margin model, tool path, machining method and the like. The various kinds of information is used for the improvement activity of the metal mold machining technique.

(j) Cutting Load Graph Generation Function 210

The cutting load graph generation function 210 displays the surface of the measured work model 212 stored in the storage device, which is colored according to values of various kinds of monitoring information stored in the storage device. For example, it is colored according to the values of the AC servo electric power.

Incidentally, in the above description, though the explanation is not carried out in consideration of differences among working processes such as rough machining, additional machining, finishing machining, and the like, needless to say, in each working process, the high accurate working is achieved by carrying out the measurement and computation with necessary accuracy in that process.

As described above, this embodiment enables integration of the NC data generation and machining, and enables artisans to handle the CAD solid data and measured work form data at the site.

In addition, the improvement, enhancement, and transfer of the skill are enabled, and the efficiency improvement is expected.

Furthermore, because one person carries out both of the NC data generation and machining, the communication document form such as working instruction sheet, working drawing, or the like and the feedback document form used when a machining failure occurred can be abolished.

The frequency of the tool damages during the machining becomes low, and the working cost can be decreased.

Because the movement path of the tool is determined after the work form is measured, it becomes possible to move the tool at high speed when moving at a place where a portion of the work does not exist, and the working time can be shortened.

Although the present invention has been described with respect to a specific preferred embodiment thereof, various change and modifications may be suggested to one skilled in the art, and it is intended that the present invention encompass such changes and modifications as fall within the scope of the appended claims.

What is claimed is:

1. A computer-aided manufacturing (CAM) system, comprising:
    a numerical control (NC) apparatus for cutting a work according to NC data, the work being an object before cutting;
    a cutting margin model generator that obtains a computer-aided design (CAD) model that is solid model data of a metal mold to be made and a measured work geometric model that is geometric model data of said work, wherein said geometric model data is obtained by measuring said work to be cut, and generates a cutting margin model that is a difference between said measured work geometric model and said CAD model; and an NC data generator that generates NC data causing said NC apparatus to carry out cutting, based on the generated cutting margin model.

2. The CAM system as set forth in claim 1, wherein said NC data generator generates NC data to cut said work by a predetermined cutting depth at a portion in which a cutting margin exists in said cutting margin model, and NC data to cause a tool to move without cutting at a portion in which any cutting margin does not exist.

3. The CAM system as set forth in claim 1, further comprising:
a unit that measures a tool form in a state in which said tool is installed to said NC apparatus, and generates a tool model, and
wherein said NC data generator generates said NC data based on both of said cutting margin model and said tool model.

4. The CAM system as set forth in claim 1, further comprising:
a unit that outputs an instruction so as to move a tool in either of a tool axis direction and a Z-axis direction, to said NC apparatus, according to a tool load state informed from said NC apparatus.

5. The CAM system as set forth in claim 1, further comprising:
a storing unit that stores data informed from said NC apparatus as monitoring data; and
a unit that displays said measured work geometric model, which is colored based on load data in said monitoring data stored by said storing unit.

6. A computer-aided manufacturing (CAM) program embodied on a medium for causing a computer connected to a numerical control (NC) apparatus to control said NC apparatus to cut a work according to NC data, said program comprising:
obtaining a computer-aided design (CAD) model that is solid model data of a metal mold to be made and a measured work geometric model that is geometric model data of a work before cutting, wherein said geometric model data is obtained by measuring said work to be cut;
generating a cutting margin model that is a difference between said measured work geometric model and said CAD model; and
generating NC data causing said NC apparatus to carry out cutting, based on the generated cutting margin model.

7. The CAM program as set forth in claim 6, wherein said generating NC data comprises generating NC data to cut said work by a predetermined cutting depth at a portion in which a cutting margin exists in said cutting margin model, and generating NC data to cause a tool to move without cutting at a portion in which any cutting margin does not exist.

8. The CAM program as set forth in claim 6, further comprising:
measuring a tool form in a state in which said tool is installed to said NC apparatus, and generating a tool model, and
wherein said generating NC data comprises generating said NC data based on both of said cutting margin model and said tool model.

9. The CAM program as set forth in claim 6, further comprising:
outputting an instruction so as to move a tool in either of a tool axis direction and a Z-axis direction, to said NC apparatus, according to a tool load state informed from said NC apparatus.

10. The CAM program as set forth in claim 6, further comprising:
storing data informed from said NC apparatus as monitoring data; and
displaying said measured work geometric model, which is colored based on load data in the stored monitoring data.

11. A method for controlling a computer-aided manufacturing (CAM) system, comprising:
obtaining a computer-aided design (CAD) model that is solid model data of a metal mold to be made and a measured work geometric model that is geometric model data of a work before cutting, wherein said geometric model data is obtained by measuring said work to be cut;
generating a cutting margin model that is a difference between said measured work geometric model and said CAD model; and
generating numerical control (NC) data causing an NC apparatus to carry out cutting, based on the generated cutting margin model.

12. The method as set forth in claim 11, wherein said generating NC data comprises generating NC data to cut said work by a predetermined cutting depth at a portion in which a cutting margin exists in said cutting margin model, and
generating NC data to cause a tool to move without cutting at a portion in which any cutting margin does not exist.

13. The method as set forth in claim 11, further comprising:
measuring a tool form in a state in which said tool is installed to an NC apparatus, and generating a tool model, and
wherein said generating NC data comprises generating said NC data based on both of said cutting margin model and said tool model.

14. The method as set forth in claim 11, further comprising:
outputting an instruction so as to move a tool in either of a tool axis direction and a Z-axis direction, to said NC apparatus, according to a tool load state informed from said NC apparatus.

15. The method as set forth in claim 11, further comprising:
storing data informed from an NC apparatus as monitoring data; and
displaying said measured work geometric model, which is colored based on load data in the stored monitoring data.

* * * * *